No. 717,711. PATENTED JAN. 6, 1903.
E. NORTON.
PROCESS OF VACUUM SEALING SHEET METAL CANS OR VESSELS.
APPLICATION FILED JULY 18, 1902.
NO MODEL.
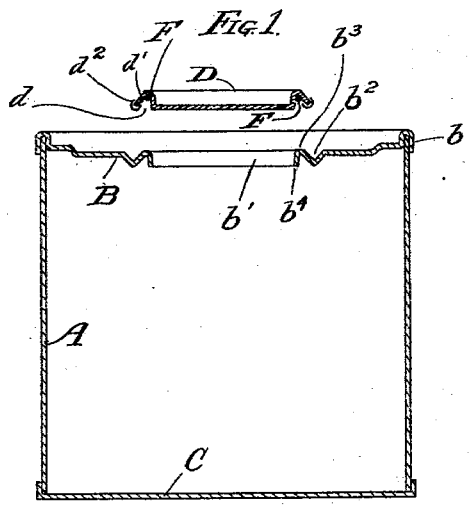
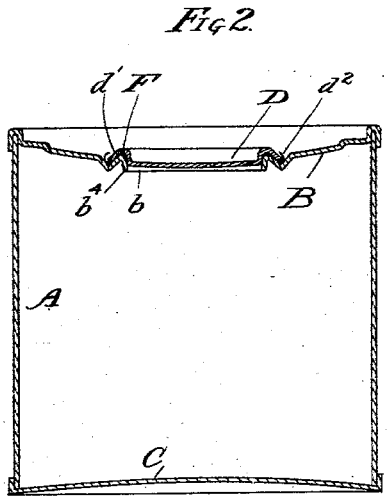
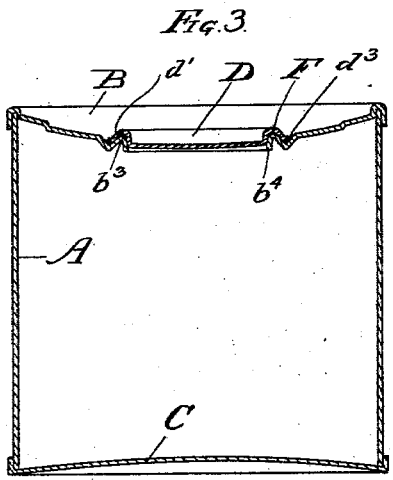
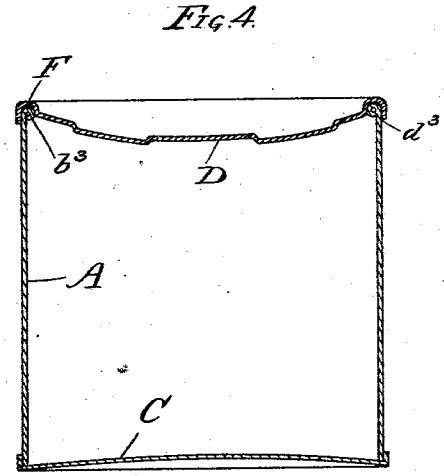
WITNESSES:
F. B. Townsend
H. M. Munday
INVENTOR.
Edwin Norton
BY Munday, Evarts & Adcock
his ATTORNEYS

UNITED STATES PATENT OFFICE.

EDWIN NORTON, OF NEW YORK, N. Y., ASSIGNOR TO THE AUTOMATIC VACUUM CANNING COMPANY, OF CHICAGO, ILLINOIS, A CORPORATION OF ILLINOIS.

PROCESS OF VACUUM-SEALING SHEET-METAL CANS OR VESSELS.

SPECIFICATION forming part of Letters Patent No. 717,711, dated January 6, 1903.

Application filed July 18, 1902. Serial No. 116,031. (No model.)

*To all whom it may concern:*

Be it known that I, EDWIN NORTON, a citizen of the United States, residing in New York, in the county of New York and State of New York, have invented a new and useful Improvement in the Art or Process of Vacuum-Sealing Sheet-Metal Cans or Vessels, of which the following is a specification.

My invention relates to the art or process of vacuum-sealing sheet-metal cans or vessels.

Heretofore vacuum-sealing sheet-metal cans in which the can is closed by a combined vacuum or atmospheric-pressure seal and a mechanical seal or seam the mechanical seal or seam is formed by a frictional, crimped, or folded seam. In my preset invention I use or may use the ordinary construction of can having a top or upper head furnished with the customary stud-hole or filling-opening and with a cap for closing the same, the construction, however, being slightly varied by providing the cap with an annular groove to receive the packing-ring and the can top or head being furnished with a seat or bearing for the packing to enable the cap to be hermetically sealed and secured to the head or top by a vacuum or atmospheric-pressure seal. The extreme edge of the flange of the cap may also preferably be provided or hemmed with a film or thin annulus of solder for subsequently uniting the cap to the can-head by the customary soldered seam or joint.

In practicing my invention the can after being filled with the goods to be preserved therein is placed within a vacuum-chamber or receiver, the cap being loosely in place thereon. The air is then exhausted from the can and its vacuum-chamber and from the can and its contents. The cap is then seated and the cap hermetically sealed and secured to the can-head by the vacuum or atmospheric-pressure seal, which is formed the instant the atmospheric pressure is restored to the vacuum-chamber. The can is then removed from the vacuum-chamber and the cap soldered to the can-head. Owing to the vacuum produced within the can at the time the can is closed by the vacuum or atmospheric-pressure seal, the heating of the can and its contents by the soldering operation will not interfere with the formation of a perfect solder joint, as the vacuum gives room for the limited expansion of steam or gases produced by the heat of the soldering operation and prevents the tendency of the expanding gases to form pin-holes or leaks in the soldered joint, as has heretofore always been the case and which heretofore has rendered it necessary to provide the can-cap with a vent-hole for escape of air or gases during the soldering operation and which vent-hole requires to be subsequently soldered up.

In the accompanying drawings, forming a part of this specification, Figure 1 is a vertical section of a can suitable for use in practicing my invention, the same showing the can and cap separated. Fig. 2 is a similar view showing the can after the second step of my process, the cap here being shown as hermetically sealed and secured by the vacuum or atmopheric-pressure seal and the can top or head being collapsed or slightly downwardly-curved by the external atmospheric pressure and the vacuum within the can. Fig. 3 is a similar view showing the can after the third step of my process, the cap being sealed and secured to the can by the combined vacuum or atmospheric-pressure seal and soldered seam or joint. Fig. 4 shows the application of my invention to cans in which the cap or cover is of the full diameter of the can-body.

In said drawings, A represents the can-body, B the upper head or top, and C the bottom head. The top or upper head B has or may have the customary flange $b$, by which it is soldered or otherwise united to the can-body, and a stud-hole or filling-opening $b'$, cap-groove $b^2$, packing-seat $b^3$, and down-turned flange $b^4$.

D is the can-cap. It is furnished with an annular groove or channel $d$ to receive the packing-ring F and with a soldering-flange $d'$, which may preferably be furnished or charged with a solder annulus $d^2$.

After the can has been filled it, with the cap D loosely in place thereon, is placed within a vacuum-chamber or the receiver of a vacuum-pump and the air is exhausted from the can and its contents. The cap D is then firmly seated on the can and the atmospheric pressure restored to the receiver, thus hermetically sealing the can and firmly compressing the packing F, which is held firmly compressed by the atmospheric pressure when the same is restored to the vacuum-chamber. The hermetically-sealed can may now be removed from the vacuum-chamber and the cap soldered in place, thus uniting it to the head by the soldered joint $d^3$, the same being a secure mechanical seal, as well as by the vacuum or atmospheric-pressure seal formed by the packing F in conjunction with the vacuum within the can and the external pressure without.

In Fig. 4 the cap or cover D is made of the full diameter of the can-body and the head B is omitted. In this construction the seat or bearing $b^3$ for the packing F is formed on the can-body itself by providing it with a suitable flange or roll. In this construction, as well as that wherein a separate head B is employed, the soldered joint or seam $d^3$ is external to the vacuum-seal formed by the packing F in conjunction with vacuum within the can and the atmospheric pressure without, so that the soldered joint or seam $d^3$ may be easily and conveniently formed in the manner heretofore and customary in use with ordinary cans which have no packing F or vacuum or atmospheric-pressure seal.

By the generic term "closure" in the claims I mean cap or cover, or both.

I claim—

1. The process of hermetically sealing and securing closures on cans consisting in first exhausting the air from the can and its contents then seating and hermetically sealing and securing the closure to the can by a vacuum or atmospheric-pressure seal and then completing the sealing and securing of the closure to the can by a solder joint, substantially as specified.

2. The process of hermetically sealing and securing caps to the tops or heads of cans consisting in first exhausting the air from the can and its contents, then hermetically sealing and securing the cap to the head by a vacuum or atmospheric-pressure seal, and then soldering the cap to the head, the vacuum within the can giving room for expansion of steam or gases by the heat of the soldering operation and preventing such expansion from forming pin-holes or leaks in the soldered joints as the solder is setting, substantially as specified.

EDWIN NORTON.

Witnesses:
EVELYN NORTON,
H. NORTON.